United States Patent [19]
Nagao et al.

[11] Patent Number: 4,748,592
[45] Date of Patent: May 31, 1988

[54] RECORDING AND REPRODUCING METHOD BY A CHANGE IN COMPOSITION ON A SOLID SURFACE

[75] Inventors: Makoto Nagao; Akira Nahara; Goro Akashi, all of Odawara, Japan

[73] Assignee: Fuji Photo Film Co., Ltd., Japan

[21] Appl. No.: 842,719

[22] Filed: Mar. 20, 1986

Related U.S. Application Data

[63] Continuation of Ser. No. 498,325, May 26, 1983, abandoned.

[30] Foreign Application Priority Data

Jun. 18, 1982 [JP] Japan .............................. 57-104820

[51] Int. Cl.⁴ .......................................... G11C 13/04
[52] U.S. Cl. .................................... 365/113; 365/118
[58] Field of Search ...................... 365/113, 118, 128; 250/425

[56] References Cited

U.S. PATENT DOCUMENTS

| | | | |
|---|---|---|---|
| 3,950,669 | 4/1976 | Smith | 365/118 |
| 4,090,253 | 5/1978 | Salgo | 365/118 |
| 4,453,078 | 6/1984 | Shimizu | 250/425 |

Primary Examiner—James W. Moffitt
Attorney, Agent, or Firm—Gerald J. Ferguson, Jr.; Michael P. Hoffman; Michael J. Foycik, Jr.

[57] ABSTRACT

In a vacuum, recording is conducted by exposing a solid surface to a neutral particle beam or an ion beam modulated with a recording signal and converged, thereby to locally develop a change in composition on the solid surface. Then, reproducing is conducted by exposing said solid surface to an electron beam, an ion beam or a neutral particle beam which has been converged, thereby to emit electrons from the solid surface, and detecting the emitted electrons to read out the change in composition. If necessary, erasing is conducted by exposing the solid surface to the same beam as used in reproducing, thereby to eliminate the change in composition.

14 Claims, 1 Drawing Sheet

RECORDING

RECORDING BEAM SOURCE (ION BEAM, OR NEUTRAL PARTICLE BEAM)

MEDIUM

VACUUM

REPRODUCING

EXCITATION BEAM SOURCE (ION BEAM, NEUTRAL PARTICLE BEAM, OR ELECTRON BEAM)

SECONDARY ELECTRON DETECTOR

MEDIUM

RECORDING AND REPRODUCING METHOD BY A CHANGE IN COMPOSITION ON A SOLID SURFACE

This application is a continuation of Ser. No. 498,325, filed 5/26/83, now abandoned.

BACKGROUND OF THE INVENTION

1. Field of the Invention

This invention relates to a novel recording and reproducing method, and more particularly to a method of carrying out high density recording and reproducing by use of an ion beam or a neutral particle beam.

2. Description of the Prior Art

There have heretofore been known various methods of high density recording. Typical of these are the magnetic recording method and the optical recording method. However, the recording density obtainable by these methods is limited since the smallest space within which a bit of information can be recorded is within the range of about 0.5 $\mu$m to 1 $\mu$m. Specifically, in the magnetic recording method, the minimum particle size (about 100 Å) at which the ferromagnetic material can exist is regarded as theoretically limiting the recording density. However, because of the characteristics of the devices used for recording and reproducing, e.g. a magnetic head, the shortest recording wavelength currently possible is limited to a range of about 1 $\mu$m to 0.7 $\mu$m. On the other hand, in the optical recording method, the recording density is limited by the diameter of the light beam employed for recording and reproducing, and the shortest recording wavelength is within the range of about 1 $\mu$m to 0.5 $\mu$m.

As the recording density increases, more information can be stored in a smaller space. Accordingly, a need exists for a method of recording and reproducing at a higher density in various technical fields.

SUMMARY OF THE INVENTION

The primary object of the present invention is to provide a novel recording and reproducing method wherein recording and reproducing can be conducted at a higher density than in conventional magnetic recording and optical recording.

Another object of the present invention is to provide a novel recording and reproducing method which can be carried out effectively in a true vacuum containing no particular constituent.

The recording and reproducing method in accordance with the present invention comprises the steps of: in a vacuum, (a) carrying out recording by causing a neutral particle beam or an ion beam modulated with a recording signal to converge and impinge upon a solid surface, thereby to locally develop a change in composition on said solid surface, and (b) carrying out reproducing by causing an electron beam, an ion beam or a neutral particle beam to converge and impinge upon said solid surface, thereby to emit electrons from said solid surface, and detecting the emitted electrons to read out said change in composition. If necessary, after the reproducing is carried out, erasing is conducted by causing the same beam as used for the reproducing to again impinge upon the solid surface, thereby to eliminate the change in composition.

At the time of reproducing, detection is conducted by utilizing the fact that the emission efficiency of the secondary electrons emitted from the solid surface exposed to the electron beam, or the electron energy spectrum changes according to changes in the composition on the solid surface. Namely, the solid surface is exposed to an electron beam, an ion beam or a neutral particle beam which causes the solid surface to emit electrons, the secondary electron emission efficiency or the electron energy spectrum is detected, and the local change in composition on the solid surface is read out by detecting the difference in the secondary electron emission efficiency or the difference in the electron energy spectrum.

The Applicant has proposed in Japanese Patent Publication No. 57(1982)-32414 a high density recording and reproducing method using an electron beam. In this method, a vacuum atmosphere containing a very small amount of an oil employed in a vacuum pump is utilized, and a carbide formed upon exposure of the oil to an electron beam is attached to a recording medium to develop a difference in the secondary electron emission efficiency on the surface of the recording medium. Accordingly, this method is operable when there is used a vacuum pump, such as rotary pump or diffusion pump, which causes the oil to be dispersed in the vacuum created thereby. However, when there is used a vacuum pump of a type which does not disperse the oil in the vacuum, such as ion pump or cryopump, it is necessary to add an oil to the vacuum atmosphere. Particularly, in view of the recent tendency of preferring a cryopump suitable for obtaining a high vacuum, the aforesaid method is not always suitable for practical use.

In the present invention, instead of utilizing carbonization of an organic constituent such as oil with an electron beam, a neutral particle beam or an ion beam is caused to converge and impinge upon the surface of a solid, thereby to locally develop a change in composition on the solid surface and thus to effect recording. Accordingly, the method in accordance with the present invention can be effectively carried out in a true vacuum, and does not require the existence of a particular constituent in the vacuum.

In the method of the present invention, the recording density (resolution) can be increased up to the limit dictated by the beam diameter of the neutral particle beam or the ion beam converged upon the solid surface. Accordingly, when a neutral particle beam or an ion beam the diameter of which can presently be reduced to about 800 Å or less is used, it is possible to conduct recording at a high recording density of about $10^9$ bits/cm$^2$. Since the diameter of the recording beam can further be reduced, it will become possible in the future to conduct recording at even a higher density.

DETAILED DESCRIPTION OF THE INVENTION

Figure 1:
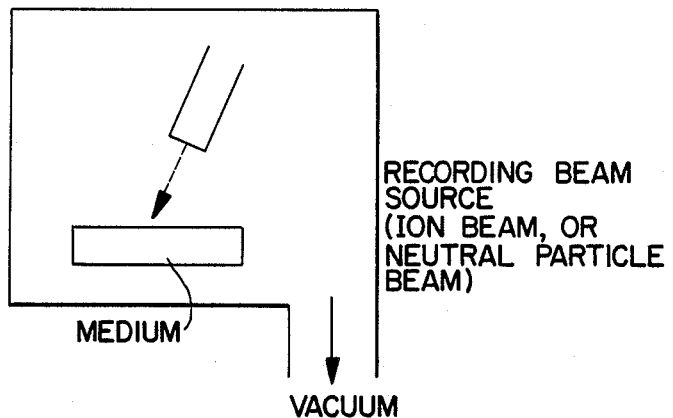
FIGS. 1 and 2 illustrate the essential steps of the present application.

In the recording step of FIG. 1, the intensity of a neutral particle beam or an ion beam is modulated with a recording signal such as a time series image signal or character pattern signal, and the intensity-modulated recording beam is caused to converge and impinge upon (scan) the surface of the solid.

By "solid" is meant any solid the surface composition of which can be changed upon exposure to the aforesaid recording beam. However, the solid should preferably exhibit an electrical conductivity of such a level that the electric charges do not accumulate. For example, the solid should exhibit a surface resistance of $10^8$ Ω cm or less at the time of recording. Thus, the solid may be a metal, a semiconductor, or the like. From the viewpoint of the reproduction output, Ag, Te, Sb or the like is particularly preferable as the solid. The solid may have a plate-like shape or may be in the form of a thin layer formed by vacuum deposition, ion plating, sputtering, plating or the like on a smooth surface formed on a substrate having an appropriate shape. However, in order to realize high density recording and reproducing, the surface of the solid should be smooth. Further, in order to eliminate noise due to intergranular portions during the reproducing step, the solid should preferably be amorphous. As amorphous solid materials, there are known Si, Gd—Fe, Gd—Co, Te—Fe, Au—Co, Fe—P—C, Fe—B, Fe—Be, Co—P, Fe—Al—Si, Ge—S, Ge—Se, Ge—As—Te, As—S, As—Se, As—Te, Ge—As—Se, and the like.

Theoretically, any element may be employed as the element of the neutral particle in the neutral particle beam or as the element of the ion in the ion beam. However, from the viewpoint of the detection sensitivity in analysis of the secondary electron emission efficiency or the electron energy spectrum, the element should preferably be Cu, Be, Ag, Mg, Sr, Ba, Ce, Cs, K, Na, Li, Rb, Ca, Cd, In, Cl, Sn, Sb. The element should particularly preferably be Cs, Li, Na, K, Rb, or Ba, among which Cs is most preferable.

When the neutral particle beam or the ion beam (recording beam) constituted by the element as described above is caused to impinge upon the surface of the aforesaid solid, the element of the recording beam is attached to or implanted into the surface of the solid. When the element is implanted into the solid surface, it should be implanted into the interior of the solid in the vicinity of the solid surface, preferably into the portion within 100 Å from the solid surface.

When the element of the recording beam is attached to or implanted into the solid surface, the composition of the corresponding portion of the solid surface changes.

Figure 2:
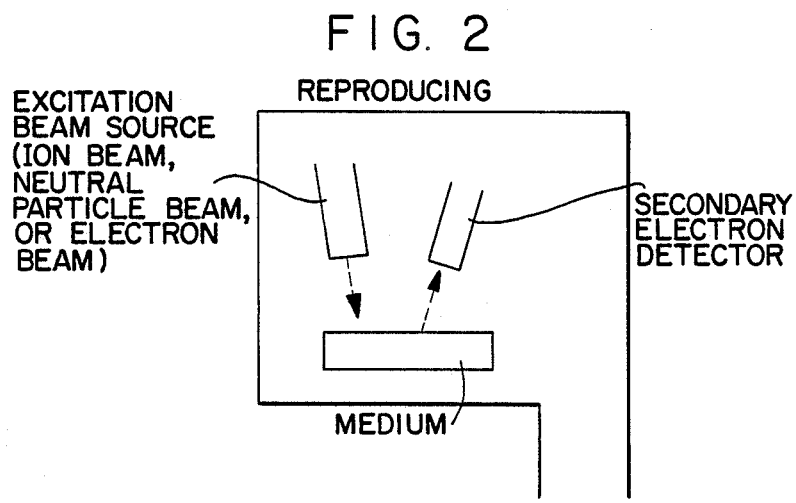

Thereafter as shown in FIG. 2, when the solid surface wherein the composition is locally changed as described above is exposed to an electron beam, or a neutral particle beam or an ion beam of an element which is gaseous at normal temperature, electrons are emitted from the solid surface at a secondary electron emission efficiency or with an electron energy spectrum differing according to the composition of the solid surface. Namely, the information recorded in the solid surface can be reproduced by detecting the secondary electrons emitted from the solid surface, and detecting the recorded pattern based on the difference in the emission efficiency, the difference in the electron energy spectrum, the difference in the absorption current, or the like. As the reproduction beam used in the reproducing step, an electron beam is preferable because of high controllability and easy beam diameter reduction.

As the reproducing system, the main ones usable are the system of detecting the secondary electron emission efficiency and the system of detecting the electron energy spectrum. The former is preferable from the viewpoint of the output intensity, and the latter is preferable from the viewpoint of elimination of adverse effect of the unevenness of the solid surface.

In the present invention, recording and reproducing are conducted by scanning the surface of the solid serving as the recording medium with the aforesaid recording beam or the reproducing beam. The signal detected in the reproducing step is sent to a reproducing apparatus of the scanning system, for example, to a cathode ray tube, and used for reproducing the recorded pattern.

After the solid is used for the recording and reproducing as described above, it can again be used for recording information. For this purpose, the solid is restored to its original condition prior to the recording by causing the neutral particle beam or the ion beam to impinge upon the surface of the solid, particularly locally upon the previously recorded portion of the solid surface, preferably at an increased energy level, thereby to perform etching of the solid surface. In this manner, the information previously recorded in the solid can be erased, and the solid can be repeatedly used for further recording. Erasing can also be effected by applying heat to the solid carrying the information recorded therein so as to diffuse the element, which contributes to the local change in composition of the solid surface, into the interior of the solid. Alternatively, erasing may also be effected by sputter etching the whole surface of the solid at one time and restoring the solid surface to the original condition. or, the solid may also be restored to the original condition by exposing the recorded portion of the solid surface to a highpower electron beam, thereby evaporating the element attached to the solid surface.

In the embodiments described above, a solid material exhibiting a low secondary electron emission efficiency is exposed to a neutral particle beam or an ion beam of a material (element) exhibiting a high secondary electron emission efficiency, so that a positive image (pattern) is recorded by recording a light pattern on a dark background (base). Various materials have been enumerated above for such recording. Conversely, it is also possible to expose a solid exhibiting a high secondary electron emission efficiency (for example, a solid shining very brightly upon exposure to an electron beam) to a beam of an element exhibiting a low secondary electron emission efficiency (which does not so shine), thereby to record a negative image (pattern) by recording a dark pattern on a light background. For such negative recording, it is possible to use Cu—Be, Ag—Cs, Te—Cs, or the like as the solid recording medium, and Mo, Ni, Te, or the like as the element constituting the recording beam.

The present invention is further illustrated by the following nonlimitative examples.

EXAMPLE 1

A thin amorphous Au—Co film was deposited to a thickness of 2,000 Å on a glass plate, and exposed to a Cs ion beam having a diameter reduced to 800 Å and modulated pulse-wise with a recording signal. This exposure was conducted in a dot pattern, and the exposure amount was about $3 \times 10^{-13}$ coulomb per dot.

Thereafter, the surface of the film was scanned with a $10^{-11}$A electron beam with an acceleration electric field at 25 kV, and observed by use of a field-emission type scanning electron microscope. A light pattern of dots having a diameter of about 800 Å could be read out.

Further, the surface of the film was scanned with an $Ar^+$ion beam, and then observed by use of a field-effect type scanning electron microscope. At this stage, the dot-like pattern disappeared, indicating that the erasing of the recorded information was effected.

EXAMPLE 2

A thin Ag film was formed to a thickness of 2,000 Å by ion plating on an aluminum plate, and exposed to a Cs ion beam having a diameter reduced to 2,000 Å and modulated pulse-wise with a recording signal. This exposure was conducted in a dot pattern, and the exposure amount was about $4 \times 10^{-14}$ coulomb per dot.

Thereafter, the surface of the film was scanned with a $10^{-11}$A electron beam with an acceleration electric field at 25 kV, and observed by use of a field-emission type scanning electron microscope. A light pattern of dots having a diameter of about 2,000 Å could be read out.

Further, the surface of the film was scanned with an Ar+ion beam, and then observed by use of a field-effect type scanning electron microscope. At this stage, the dot-like pattern disappeared, indicating that the erasing of the recorded information was effected.

EXAMPLE 3

A well polished surface of a 5 mm thick Te layer was exposed to a K ion beam having a diameter reduced to 5,000 Å and modulated pulse-wise with a recording signal. This exposure was conducted in a dot pattern, and the exposure amount was about $5 \times 10^{-14}$ coulomb per dot.

Thereafter, the surface of the film was scanned with a $10^{-11}$A electron beam with an acceleration electric field at 25 kV, and observed by use of a field-emission type scanning electron microscope. A light pattern of dots having a diameter of about 5,000 Å could be read out.

Further, the surface of the film was scanned with an Ar+ion beam, and then observed by use of a field-effect type scanning electron microscope. At this stage, the dot-like pattern disappeared, indicating that the erasing of the recorded information was effected.

EXAMPLE 4

A thin Cu—Be layer was formed to a thickness of 6,000 Å by sputtering on a Si substrate, and exposed to a Mo ion beam having a diameter reduced to about 2,000 Å at a voltage of 2 kV. This exposure was conducted in a linear form, and the exposure amount was about $10^{-12}$ coulomb per length of 2,000 Å.

When the surface of the film was observed by use of a scanning electron microscope in the same manner as described in Examples 1 to 3, a pattern of dark lines of about 2,000 Å was observed, indicating that the recording was effected.

Thereafter, this sample was sputtered for two minutes at 300 W in a RF sputtering apparatus, and then observed by use of a scanning electron microscope. At this stage, the linear pattern disappeared, indicating that the recorded information was erased.

EXAMPLE 5

An Ag layer was formed to a thickness of 5,000 Å by sputtering on a well polished Cu plate, and the surface of the Ag layer was exposed to a Cs neutral particle beam having a diameter reduced to 4,000 Å. This exposure was conducted in a dot pattern, and the exposure amount was about $10^{-12}$ coulomb per dot.

Thereafter, the surface of the Ag layer was scanned with an electron beam, and the secondary electrons emitted from the surface of the Ag layer in synchronization with the scanning were caught. The energy spectrum of the secondary electrons was analyzed, and the MNN Auger signal of Ag positioned at about 351 eV was observed. A portion where the Auger signal was attenuated in a dot pattern could been observed. Analyses of the energy spectrum at this portion revealed that the MNN peak was at 563 eV, indicating Cs, and that the recording was effected.

Further, the surface of the Ag layer was scanned with $10^{-2}{}_A$ electron beam at 10 kV, and then again observed by the method as described above. At this stage, Cs was not observed, indicating that the recorded information was erased.

We claim:

1. A recording and reproducing method comprising the steps:
   in a vacuum,
   (a) carrying out recording at a high recording density by causing a neutral particle beam or an ion beam modulated with a recording signal to converge and impinge upon an amorphous solid surface, thereby to locally develop a change in composition on said solid surface, said neutral particle beam or ion beam comprising an element selected from the group consisting of Cs, Li, Na, K, Rb and Ba where said element is attached to or implanted in said amorphous solid surface to thereby effect the locally developed change in said composition on the amorphous solid surface, said neutral particle beam or ion beam being converged to give a beam diameter of about 800 Å or less, and
   (b) carrying out reproducing by causing an electron beam, an ion beam or a neutral particle beam to converge and impinge upon said amorphous solid surface, thereby to emit secondary electrons from said solid surface, and detecting the emitted secondary electrons to read out said change in composition, noise during said reproducing step, due to intergranular portions, being eliminated because of the amorphous structure of the solid surface.

2. The method as defined in claim 1, wherein said reproducing is carried out by causing an electron beam to impinge upon said solid surface, and detecting the secondary electron emission efficiency to read out said local change in composition of said solid surface.

3. A recording and reproducing method as defined in claim 1, wherein said reproducing is carried out by detecting the energy spectrum of said electrons to read out said local change in composition of said solid surface.

4. The method as defined by claim 3, wherein said reproducing is carried out by causing an electron beam to impinge upon said solid surface, and detecting the secondary electron emission efficiency to read out said local change in composition of said solid surface.

5. A recording and reproducing method is in claim 1 where said amorphous solid surface is selected from the group consisting of Si, Gd—Fe, Gd—Co, Te—Fe, Au—Co, Fe—P—C, Fe—B, Fe—Be, Co—P, Fe—Al—Si, Ge—As—Te, As—S, As—Se, As—Te, Ge—As—Se, Ge—S, and Ge—Se.

6. A recording and reproducing method comprising the steps:
   in a vacuum
   (a) carrying out recording at a high recording density by causing a neutral particle beam or an ion beam modulated with a recording signal to converge and impinge upon a solid surface, thereby to locally develop a change in composition on said solid surface, said neutral particle beam or ion beam comprising an element selected from the group consisting of Cs, Li, Na, K, Rb and Ba where said element is attached to or implanted in said solid surface to thereby effect the locally developed change in said composition on the solid surface, said solid surface containing at least one element selected from the group consisting of Ag, Te, and Sb, said neutral particle beam or ion beam being converged to give a beam diameter of about 800 Å or less, and (b) carrying out reproducing by causing an electron beam, ion beam or a neutral particle beam to converge and impinge upon said solid surface, thereby to emit secondary electrons from said solid surface, and detecting the emitted secondary electrons to read out said change in composition, said Ag, Te, or Sb being present from the viewpoint of the reproducing step.

7. The recording and reproducing method as defined in claim 6, wherein said reproducing is carried out by detecting the energy spectrum of said electrons to read out said local change in composition of said solid surface.

8. A recording and reproducing method comprising the steps:

in a vacuum (a) carrying out recording at a high recording density by causing a neutral particle beam or an ion beam modulated with a recording signal to converge and impinge upon an amorphous solid surface, thereby to locally develop a change in composition on said solid surface, said neutral particle beam or ion beam comprising an element selected from the group consisting of Cs, Li, Na, K, Rb and Ba where said element is attached to or implanted in said amorphous solid surface to thereby effect the locally developed change in said composition on the amorphous solid surface, said neutral particle beam or ion beam being converged to give a beam diameter of about 800 Å or less, (b) carrying out reproducing by causing an electron beam, an ion beam or a neutral particle beam to converge and impinge upon said amorphous solid surface, thereby to emit secondary electrons from said solid surface, and detecting the emitted secondary electrons to read out said change in composition, noise during said reproducing step, due to intergranular portions, being eliminated because of the amorphous structure of the solid surface, and (c) carrying out erasing by causing an electron beam, an ion beam or a neutral particle beam to impinge on said solid surface, to thereby eliminate said change in composition.

9. The method as defined by claim 8, wherein said reproducing is carried out by causing an electron beam to impinge upon said solid surface, and detecting the secondary electron emission efficiency to read out said local change in composition of said solid surface.

10. The method as defined by claim 8, wherein said reproducing is carried by detecting the energy spectrum of said electrons to read out said local change in composition of said solid surface.

11. A recording and reproducing method is in claim 8 where said amorphous solid surface is selected from the group consisting of Si, Gd—Fe, Gd—Co, Te—Fe, Au—Co, Fe—P—C, Fe—B, Fe—Be, Co—P, Fe—Al—Si, Ge—As—Te, As—S, As—Se, As—Te, Ge—As—Se, Ge—S, and Ge—Se.

12. A recording and reproducing method comprising the steps:

in a vacuum (a) carrying out recording at a high recording density by causing a neutral particle beam or an ion beam modulated with a recording signal to converge and impinge upon a solid surface, thereby to locally develop a change in composition on said solid surface, said neutral particle beam or ion beam comprising an element selected from the group consisting of Cs, Li, Na, K, Rb and Ba where said element is attached to or implanted in said solid surface to thereby effect the locally developed change in said composition on the solid surface, said solid surface containing at least one element selected from the group consisting of Ag, Te, and Sb, said neutral particle beam or ion beam being converged to give a beam diameter of about 800 Å or less, (b) carrying out reproducing by causing an electron beam, an ion beam or a neutral particle beam to converge and impinge upon said solid surface, thereby to emit secondary electrons from said solid surface, and detecting the emitted secondary electrons to read out said change in composition, said Ag, Te, or Sb being present from the viewpoint of the reproducing step, and (c) carrying out erasing by causing an electron beam, an ion beam, or a neutral particle beam to impinge upon said solid surface, thereby to eliminate said change in composition.

13. The method is defined by claim 12, wherein said reproducing is carried out by causing an electron beam to impinge upon said solid surface, and detecting the secondary electron emission efficiency to read out said local change in composition of said solid surface.

14. The method as defined by claim 12, wherein said reproducing is carried out by detecting the energy spectrum of said electrons to read out said local change in composition of said solid surface.

* * * * *